US011046871B2

(12) United States Patent
Nagai et al.

(10) Patent No.: US 11,046,871 B2
(45) Date of Patent: Jun. 29, 2021

(54) POLYOLEFIN RESIN FOAM SHEET AND ADHESIVE TAPE

(71) Applicant: SEKISUI CHEMICAL CO., LTD., Osaka (JP)

(72) Inventors: Kento Nagai, Shiraoka (JP); Shigeki Matsuki, Shenzhen (CN)

(73) Assignee: SEKISUI CHEMICAL CO., LTD., Osaka (JP)

( * ) Notice: Subject to any disclaimer, the term of this patent is extended or adjusted under 35 U.S.C. 154(b) by 164 days.

(21) Appl. No.: 15/779,171

(22) PCT Filed: Nov. 29, 2016

(86) PCT No.: PCT/JP2016/085423
§ 371 (c)(1),
(2) Date: May 25, 2018

(87) PCT Pub. No.: WO2017/094723
PCT Pub. Date: Jun. 8, 2017

(65) Prior Publication Data
US 2018/0355219 A1    Dec. 13, 2018

(30) Foreign Application Priority Data

Nov. 30, 2015  (JP) .............................. JP2015-233149

(51) Int. Cl.
| | |
|---|---|
| C09J 7/26 | (2018.01) |
| B29C 48/08 | (2019.01) |
| B29C 48/00 | (2019.01) |
| B32B 5/18 | (2006.01) |
| B32B 27/32 | (2006.01) |
| B32B 27/00 | (2006.01) |
| C08J 9/10 | (2006.01) |
| C09J 7/20 | (2018.01) |
| B29C 55/00 | (2006.01) |
| B29C 55/12 | (2006.01) |
| B29K 23/00 | (2006.01) |
| B29L 7/00 | (2006.01) |

(52) U.S. Cl.
CPC ............. *C09J 7/26* (2018.01); *B29C 48/0012* (2019.02); *B29C 48/022* (2019.02); *B29C 48/08* (2019.02); *B29C 55/005* (2013.01); *B29C 55/12* (2013.01); *B32B 5/18* (2013.01); *B32B 27/00* (2013.01); *B32B 27/32* (2013.01); *C08J 9/10* (2013.01); *C08J 9/103* (2013.01); *C09J 7/20* (2018.01); *B29K 2023/0625* (2013.01); *B29L 2007/002* (2013.01); *C08J 2203/04* (2013.01); *C08J 2205/04* (2013.01); *C08J 2205/06* (2013.01)

(58) Field of Classification Search
CPC .............. C09J 7/26; C09J 7/20; B29C 48/022
See application file for complete search history.

(56) References Cited

FOREIGN PATENT DOCUMENTS

| | | | | |
|---|---|---|---|---|
| EP | 2799472 A1 | * | 11/2014 | .............. C08L 23/14 |
| JP | 2009-242541 | | 10/2009 | |
| JP | 2010-260880 | | 11/2010 | |
| JP | 2012-214800 | | 11/2012 | |
| JP | 2013-53177 | | 3/2013 | |
| JP | 2013-53179 | | 3/2013 | |
| JP | 5785514 | | 7/2015 | |
| JP | 6496414 | | 4/2019 | |
| WO | 2013/099755 | | 7/2013 | |
| WO | 2013/100015 | | 7/2013 | |
| WO | 2013/141167 | | 9/2013 | |
| WO | 2015/046526 | | 4/2015 | |

OTHER PUBLICATIONS

Translation of JP 2012-214800. See IDS filed May 25, 2018 for date and inventor.*
International Search Report dated Jan. 10, 2017 in International (PCT) Application No. PCT/JP2016/085423.
Extended European Search Report dated May 21, 2019 in corresponding European Patent Application No. 16870660.4.

* cited by examiner

*Primary Examiner* — Chinessa T. Golden
(74) *Attorney, Agent, or Firm* — Wenderoth, Lind & Ponack, L.L.P.

(57) ABSTRACT

There is provided a polyolefin resin foam sheet formed by foaming a polyolefin resin, wherein the expansion ratio of the foam sheet is 1.5 to 20 cm³/g, the average cell sizes in the MD direction and the TD direction of the foam sheet are 130 μm or less, and the following formulas (1) and (2) are satisfied:

$$T_M/D \geq 6 \quad (1); \text{ and}$$

$$T_T/D \geq 5 \quad (2), \text{ where}$$

$T_M$ denotes the tensile strength at 90° C. in the MD direction,
$T_T$ denotes the tensile strength at 90° C. in the TD direction, and
D denotes the density (g/cm³) of the foam sheet.

7 Claims, No Drawings

POLYOLEFIN RESIN FOAM SHEET AND ADHESIVE TAPE

TECHNICAL FIELD

The present invention relates to a polyolefin resin foam sheet obtained by foaming a polyolefin resin and an adhesive tape using the same.

BACKGROUND ART

In electronic equipment having a display screen, such as a smartphone or laptop computer, a cushioning material for absorbing impact and protecting the display screen is provided between a panel protecting the display screen and the housing of the equipment (see Patent Literature 1, for example). The electronic equipment is often used with the display screen being positioned vertically upright, and this requires the cushioning material to have excellent shear strength. Further, the electronic equipment tends to have a high internal temperature due to a large amount of heat generated by electronic parts which are densely integrated, and the electronic equipment may itself be used in an outdoor environment of high temperature. It is therefore desired that the cushioning material exhibit excellent shear strength even at high temperature.

CITATION LIST

Patent Literature

PTL1: WO 2013/099755

SUMMARY OF INVENTION

Technical Problem

Increasing the shear strength of a foam sheet has necessitated thickening the foam sheet, and the thickened foam sheet is difficult to use in small-sized electronic equipment.

The present invention has been made in view of the above conventional circumstances, and an object of the present invention is to provide: a polyolefin resin foam sheet having excellent shear strength despite being thin; and an adhesive tape using the same.

Solution to Problem

As a result of extensive and intensive studies, the present inventors have found that the above problem can be solved by controlling the tensile strength of a foam sheet at high temperature and the density of the foam sheet so as to satisfy a predetermined relationship, and have completed the present invention.

Specifically, the following [1] and [2] are the gist of the present invention.

[1] A polyolefin resin foam sheet formed by foaming a polyolefin resin, the foam sheet having the expansion ratio of 1.5 to 20 cm$^3$/g, the foam sheet having the average cell sizes of 130 μm or less in the MD direction and the TD direction respectively, and satisfying the following formulas (1) and (2):

$$T_M/D \geq 6 \quad (1); \text{ and}$$

$$T_T/D \geq 5 \quad (2), \text{ where}$$

$T_M$ denotes the tensile strength at 90° C. in the MD direction,
$T_T$ denotes the tensile strength at 90° C. in the TD direction, and
D denotes the density (g/cm$^3$) of the foam sheet.

[2] An adhesive tape having a pressure sensitive adhesive layer provided on at least one surface of the polyolefin resin foam sheet according to the above [1].

Advantageous Effects of Invention

The present invention can provide: a polyolefin resin foam sheet having excellent shear strength despite being thin; and an adhesive tape using the same.

DESCRIPTION OF EMBODIMENTS

[Polyolefin Resin Foam Sheet]

The polyolefin resin foam sheet (hereinafter, also referred to as the "foam sheet") of the present invention is a sheet obtained by foaming a polyolefin resin, and it has a large number of cells.

Hereinafter, the polyolefin resin foam sheet of the present invention will be described further in detail.

<Expansion Ratio>

The expansion ratio of the foam sheet of the present invention is 1.5 cm$^3$/g or more, more preferably 1.7 cm$^3$/g or more, and further preferably 1.9 cm$^3$/g or more in view of improving impact-absorbing properties. In view of improving the shear strength of the foam sheet, the expansion ratio is 20 cm$^3$/g or less, preferably 18 cm$^3$/g or less, more preferably 17 cm$^3$/g or less, further preferably 15 cm$^3$/g or less, further more preferably 14 cm$^3$/g or less, further more preferably 12 cm$^3$/g or less, further more preferably 10 cm$^3$/g or less, further more preferably 8 cm$^3$/g or less, and further more preferably 6 cm$^3$/g or less.

The expansion ratio in the present invention refers to a reciprocal of the density of the foam sheet as measured according to JIS K7222.

<Average Cell Size>

In the foam sheet of the present invention, the average cell size in the MD direction is preferably 10 μm or more, more preferably 20 μm or more, further preferably 30 μm or more, further more preferably 35 μm or more, further more preferably 40 μm or more, further more preferably 45 μm or more, and further more preferably 50 μm or more in view of improving the flexibility of the foam sheet and the conformability of the foam sheet to irregularities. In view of improving the shear strength of the foam sheet, the average cell size in the MD direction is 130 μm or less, preferably 120 μm or less, more preferably 110 μm or less, further preferably 100 μm or less, further more preferably 90 μm or less, further more preferably 80 μm or less, and further more preferably 70 μm or less.

In the foam sheet of the present invention, the average cell size in the TD direction is preferably 10 μm or more, more preferably 20 μm or more, further preferably 30 μm or more, further more preferably 40 μm or more, and further more preferably 50 μm or more in view of improving the flexibility of the foam sheet and the conformability of the foam sheet to irregularities. In view of improving the shear strength of the foam sheet, the average cell size in the TD direction is 130 μm or less, preferably 125 μm or less, more preferably 120 μm or less, further preferably 110 μm or less, further more preferably 100 μm or less, further more preferably 90 μm or less, further more preferably 80 μm or less, and further more preferably 70 μm or less.

In the present invention, "MD" means Machine Direction, and it means a direction that is in agreement with the direction of extrusion or the like of a polyolefin resin foam sheet. Further, "TD" means Transverse Direction, and it means a direction that is orthogonal to MD and parallel to the foam sheet.

The average cell size can be measured in accordance with the method in Examples to be described below.

<Relationship Between Density (D) and Tensile Strength at 90° C. in Foam Sheet>

The foam sheet of the present invention satisfies the following formulas (1) and (2).

$$T_M/D \geq 6 \quad (1)$$

$$T_T/D \geq 5 \quad (2)$$

$T_M$: Tensile strength at 90° C. in the MD direction
$T_T$: Tensile strength at 90° C. in the TD direction
D: Density (g/cm$^3$) of the foam sheet The "tensile strengths" in the present invention refer to strengths in the MD and TD directions as determined by cutting the foam sheet into a No. 1 dumbbell specimen as specified in JIS K6251 4.1 and testing the specimen at 90° C. according to JIS K6767.

$T_M/D$ in the formula (1) is 6 or more, preferably 6.1 or more, more preferably 6.5 or more, further preferably 7.0 or more, and further more preferably 7.5 or more and is preferably 48 or less, more preferably 20 or less, further preferably 16 or less, further more preferably 14 or less, further more preferably 12 or less, and further more preferably 10 or less, in view of improving the shear strength of the foam sheet.

$T_T/D$ in the formula (2) is 5 or more, preferably 5.2 or more, more preferably 5.4 or more, further preferably 5.6 or more, and further more preferably 5.8 or more, and is preferably 30 or less, more preferably 20 or less, further preferably 16 or less, further more preferably 14 or less, further more preferably 12 or less, further more preferably 10 or less, and further more preferably 8 or less, in view of improving the shear strength of the foam sheet.

<Density>

The density of the foam sheet of the present invention is preferably 0.01 g/cm$^3$ or more, more preferably 0.03 g/cm$^3$ or more, and further preferably 0.05 g/cm$^3$ or more in view of improving the shear strength of the foam sheet and in view of improving the material strength. In view of improving the flexibility of the foam sheet, the density of the foam sheet is preferably 1 g/cm$^3$ or less, more preferably 0.8 g/cm$^3$ or less, and further preferably 0.6 g/cm$^3$ or less. The density refers to that measured according to JIS K7222.

<Tensile Strength at 90° C. in MD Direction>

The tensile strength at 90° C. in the MD direction of the foam sheet of the present invention is preferably 0.1 MPa or more, more preferably 0.3 MPa or more, further preferably 0.5 MPa or more, further more preferably 0.7 MPa or more, and further more preferably 0.9 MPa or more in view of improving the shear strength of the foam sheet and in view of improving the material strength. In view of improving the workability of the foam sheet, the tensile strength at 90° C. in the MD direction is preferably 10 MPa or less, more preferably 8 MPa or less, further preferably 6 MPa or less, further more preferably 5 MPa or less, and further more preferably 4 MPa or less.

The tensile strengths at 90° C. can be measured in accordance with the method in Examples described below.

<Tensile Strength at 90° C. in TD Direction>

The tensile strength at 90° C. in the TD direction of the foam sheet of the present invention is preferably 0.1 MPa or more, more preferably 0.3 MPa or more, further preferably 0.5 MPa or more, further more preferably 0.7 MPa or more, and further more preferably 0.9 MPa or more in view of improving the shear strength of the foam sheet and in view of improving the material strength. In view of improving the workability of the foam sheet, the tensile strength at 90° C. in the TD direction is preferably 10 MPa or less, more preferably 8 MPa or less, further preferably 6 MPa or less, further more preferably 5 MPa or less, and further more preferably 4 MPa or less.

<Tensile Strength at 23° C. in MD Direction>

The tensile strength at 23° C. in the MD direction of the foam sheet of the present invention is preferably 0.5 MPa or more, more preferably 1 MPa or more, further preferably 1.5 MPa or more, further more preferably 2.0 MPa or more, and further more preferably 2.5 MPa or more in view of improving the shear strength of the foam sheet and in view of improving the material strength. In view of improving the workability of the foam sheet, the tensile strength at 23° C. in the MD direction is preferably 35 MPa or less, more preferably 32 MPa or less, further preferably 30 MPa or less, further more preferably 28 MPa or less, further more preferably 26 MPa or less, and further more preferably 24 MPa or less.

The tensile strengths at 23° C. can be measured in accordance with the method in Examples described below.

<Tensile Strength at 23° C. in TD Direction>

The tensile strength at 23° C. in the TD direction of the foam sheet of the present invention is preferably 0.5 MPa or more, more preferably 1 MPa or more, further preferably 1.3 MPa or more, further more preferably 1.7 MPa or more, and further more preferably 2.0 MPa or more in view of improving the shear strength of the foam sheet and in view of improving the material strength. In view of improving the workability of the foam sheet, the tensile strength at 23° C. in the TD direction is preferably 30 MPa or less, more preferably 28 MPa or less, further preferably 26 MPa or less, further more preferably 24 MPa or less, further more preferably 22 MPa or less, and further more preferably 20 MPa or less.

<Shear Strength at 90° C.>

The shear strength at 90° C. of the foam sheet of the present invention is preferably 0.3 MPa or more, more preferably 0.6 MPa or more, further preferably 0.8 MPa or more, and further more preferably 0.9 MPa or more and is preferably 10 MPa or less and more preferably 5 MPa or less, in view of making the foam sheet suitable for use as a cushioning material for a display screen of electronic equipment.

The shear strength at 90° C. can be measured in accordance with the method in Examples described below.

<Thickness>

The thickness of the foam sheet of the present invention is preferably 0.02 mm or more, more preferably 0.05 mm or more, further preferably 0.08 mm or more, and further more preferably 0.1 mm or more in view of improving the shear strength of the foam sheet and in view of improving the material strength. In view of improving the flexibility and the conformability to irregularities and in view of using the foam sheet within slim electronic equipment, the thickness of the foam sheet is preferably 0.8 mm or less, more preferably 0.75 mm or less, further more preferably 0.7 mm or less, and further more preferably 0.65 mm or less.

<25% Compressive Strength>

The 25% compressive strength of the foam sheet of the present invention is preferably 10 kPa or more, more preferably 15 kPa or more, further preferably 20 kPa or more, further more preferably 25 kPa or more, further more preferably 30 kPa or more, and further more preferably 35 kPa or more in view of improving the shear strength and impact-absorbing properties of the foam sheet. In view of improving the flexibility of the foam sheet and in view of improving the conformability to irregularities, the 25% compressive strength is preferably 1,000 kPa or less, more preferably 900 kPa or less, further preferably 850 kPa or less, further more preferably 800 kPa or less, further more preferably 750 kPa or less, and further more preferably 700 kPa or less. The present invention can provide a foam sheet having excellent shear strength while having low compressive strength and hence high flexibility.

The 25% compressive strength can be measured in accordance with the method described in Examples to be described below.

<Gel Fraction (Degree of Crosslinking)>

The foam sheet of the present invention is preferably crosslinked in view of improving the shear strength of the foam sheet. When the foam sheet is crosslinked, the gel fraction (degree of crosslinking) is preferably 5 to 60% by mass. The gel fraction is more preferably 55% by mass or less. The gel fraction is more preferably 25% by mass or more, further preferably 35% by mass or more, and further more preferably 40% by mass or more. When the gel fraction (degree of crosslinking) is equal to or more than the above lower limit, the crosslinking is sufficient, and foaming of the crosslinked product can result in a foam sheet having excellent shear strength. The higher the gel fraction is, the easier it is to improve the shear strength. Further, when the gel fraction (degree of crosslinking) is equal to or less than the above upper limit, the flexibility of the foam sheet will be easily secured.

The gel fraction (degree of crosslinking) can be measured in accordance with the method in Examples described below.

<Percentage of Closed Cells>

In the foam sheet, the cells are preferably closed cells. "The cells being closed cells" means that the proportion of closed cells relative to all the cells (referred to as "percentage of closed cells") is 70% or more. When an impact is applied to cells, the deformation amount of the cells will be suppressed when the cells are closed cells. Thereby, the deformation amount of the foam sheet by the impact will be suppressed to thereby more easily increase impact-absorbing properties.

In order to improve the impact-absorbing properties, the percentage of closed cells is preferably 70 to 100%, more preferably 80 to 100%, and further preferably 90 to 100%.

Further, when the percentage of closed cells is within the above range, movement of air within the foam sheet is limited, and heat transfer induced by air convection can be reduced, so that the thermal insulation properties are improved.

The percentage of closed cells refers to that as measured according to ASTM D2856 (1998).

[Polyolefin Resin]

Examples of the polyolefin resin used for forming a foam sheet include a polyethylene resin, a polypropylene resin, and mixtures thereof.

<Polyethylene Resin>

The polyethylene resin may be an ethylene homopolymer, but a polyethylene resin obtained by optionally copolymerizing an ethylene and a small amount (for example, 30% by mass or less, preferably 10% by mass or less, of total monomers) of α-olefin is preferred, and a linear low density polyethylene is preferred among these resins.

Specific examples of α-olefins constituting the polyethylene resin include propylene, 1-butene, 1-pentene, 4-methyl-1-pentene, 1-hexene, 1-heptene, and 1-octene. Among them, α-olefins having 4 to 10 carbon atoms are preferred.

Further, an ethylene-vinyl acetate copolymer is also preferred as a polyethylene resin. The ethylene-vinyl acetate copolymer is generally a copolymer containing 50% by mass or more of ethylene units. The vinyl acetate content of the ethylene-vinyl acetate copolymer is, for example, 5 to 50% by mass, preferably 10 to 40% by mass, and more preferably 15 to 35% by mass. The vinyl acetate content refers to that measured according to JIS K6924-1.

The polyethylene resin preferably has a low density in order to improve the flexibility and hence impact-absorbing properties of the foam sheet. Specifically, the density of the polyethylene resin is preferably 0.920 g/cm$^3$ or less, more preferably 0.880 to 0.915 g/cm$^3$, and further preferably 0.885 to 0.910 g/cm$^3$. An example of the polyethylene resin having such a density is a linear low density polyethylene. The density refers to that measured according to ASTM D792.

<Polypropylene Resin>

Examples of the polypropylene resin include: a propylene homopolymer; and a propylene-ethylene copolymer, propylene-ethylene-α-olefin copolymer, and propylene-α-olefin copolymer which contain 50% by mass or more of propylene units. These may be used singly or in combination of two or more.

Specific examples of α-olefins constituting the propylene-α-olefin copolymer include 1-butene, 1-pentene, 4-methyl-1-pentene, 1-hexene, 1-heptene, and 1-octene, and α-olefins having 6 to 12 carbon atoms are preferred among them.

In view of improving the flexibility and impact-absorbing properties, the polyolefin resin in the present invention is preferably a polyethylene resin, polypropylene resin, or mixtures thereof which is polymerized using a metallocene compound, Ziegler-Natta compound, chromium oxide compound or the like as a catalyst. Among polyethylene resins, a linear low density polyethylene is more preferred.

When a polyethylene resin, ethylene-vinyl acetate copolymer, or mixtures thereof which is obtained using a metallocene compound as a catalyst is employed, the content of the polyethylene resin, ethylene-vinyl acetate copolymer, or mixture thereof is preferably 40% by mass or more, more preferably 50% by mass or more, further preferably 60% by mass or more, and further more preferably 100% by mass based on the total amount of the polyolefin resin.

When a linear low density polyethylene is used, the linear low density polyethylene may be used singly as the polyolefin resin or may be used in combination with a polyolefin resin other than the linear low density polyethylene. An example of the polyolefin resin used in combination is an ethylene-vinyl acetate copolymer. Further, when a linear low density polyethylene is used, the content of the linear low density polyethylene is preferably 20 to 100% by mass and preferably 30 to 100% by mass based on the total amount of the polyolefin resin. The content of the ethylene-vinyl acetate copolymer used in combination with the linear low density polyethylene is preferably 80% by mass or less and more preferably 70% by mass or less.

<Metallocene Compound>

Examples of the metallocene compounds suitable include a compound such as a bis(cyclopentadienyl)metal complex having a structure in which a transition metal is sandwiched by unsaturated compounds each having a π-electron system. More specific examples include a compound in which one or more cyclopentadienyl rings or analogs thereof are present as ligands on a tetravalent transition metal such as titanium, zirconium, nickel, palladium, hafnium, and platinum.

In such a metallocene compound, active sites have uniform properties, and each active site has the same degree of activity. A polymer synthesized using a metallocene compound has high uniformity in molecular weight, molecular weight distribution, composition, composition distribution, and the like. Therefore, when a sheet containing a polymer synthesized using a metallocene compound is crosslinked, the crosslinking proceeds uniformly. Since a uniformly crosslinked sheet is easily uniformly stretched, the thickness of the crosslinked polyolefin resin foam sheet can be easily made uniform.

Examples of the ligands include a cyclopentadienyl ring and an indenyl ring. These cyclic compounds may be substituted with a hydrocarbon group, a substituted hydrocarbon group, or a hydrocarbon-substituted metalloid group. Examples of the hydrocarbon group include a methyl group, an ethyl group, various propyl groups, various butyl groups, various amyl groups, various hexyl groups, a 2-ethylhexyl group, various heptyl groups, various octyl groups, various nonyl groups, various decyl groups, various cetyl groups, and a phenyl group. Note that "various" means various isomers including n-, sec-, tert-, and iso-.

Further, an oligomer obtained by polymerizing a cyclic compound may be used as a ligand.

Furthermore, a monovalent anion ligand such as chloride and bromide, a bivalent anion chelate ligand, hydrocarbon, alkoxide, arylamide, aryloxide, amide, arylamide, phosphide, arylphosphide, and the like may be used in addition to the unsaturated compounds each having a π-electron system.

Examples of the metallocene compound containing a tetravalent transition metal and a ligand include cyclopentadienyltitanium tris(dimethylamide), methylcyclopentaclienyltitanium tris(dimethylamide), bis(cyclopentaclienyl)titanium dichloride, and dimethylsilyltetramethylcyclopentadienyl-t-butylamidezirconium dichloride.

A metallocene compound exhibits the action as a catalyst by using it in combination with a specific cocatalyst (promoter) when various olefins are polymerized. Specific examples of the cocatalyst include methyl aluminoxane (MAO) and a boron-based compound. The ratio of the molar amount of the cocatalyst to be used relative to that of the metallocene compound is preferably 10 to 1,000,000, more preferably 50 to 5,000.

<Ziegler-Natta Compound>

The Ziegler-Natta compound is a triethylaluminum-titanium tetrachloride solid composite, and is preferably produced by a method including producing a titanium trichloride composition by reducing titanium tetrachloride with an organoaluminum compound and treating with various electron donors and electron acceptors, and then combining the titanium trichloride composition, an organoaluminum compound, and an aromatic carboxylate (refer to JP 56-100806 A, JP 56-120712 A, and JP 58-104907 A), a method involving using a supported catalyst in which titanium tetrachloride and various electron donors are brought into contact with a magnesium halide (refer to JP 57-63310 A, JP 63-43915 A, and JP 63-83116 A), or the like.

<Other Components Optionally Contained in Polyolefin Resin>

A polyolefin resin other than the above-described polyolefin resins can also be used in combination.

Further, various additives and other optional components to be described below may be mixed with the polyolefin resin, and a foam sheet may comprise a mixture which has been crosslinked and foamed.

Examples of the optional components contained in a foam sheet include a resin and a rubber other than the polyolefin resin. The total content of the resin and rubber is less than the content of the polyolefin resin, and is generally 50 parts by mass or less, preferably 30 parts by mass or less, based on 100 parts by mass of the polyolefin resin.

[Method for Producing Foam Sheet]

The foam sheet of the present invention can be produced by foaming a polyolefin resin by a common method. The method for producing the polyolefin resin foam sheet is not limited, and the foam sheet can also be produced by crosslinking the polyolefin resin composition as needed followed by foaming.

Specifically, the foam sheet of the present invention can be produced, for example, by a method comprising the following steps (1) to (3):

Step (1): A step of obtaining a sheet-shaped polyolefin resin composition by feeding a polyolefin resin, a blowing agent of heat decomposition type, and other additives to an extruder, melt-kneading these components, and extruding the melt-kneaded mixture from the extruder into a sheet shape;

Step (2): A step of crosslinking the sheet-shaped polyolefin resin composition; and Step (3): A step of heating the sheet-shaped crosslinked polyolefin resin composition to foam the blowing agent of heat decomposition type and stretching the sheet preferably either in the MD direction or in the TD direction, or in both directions.

Note that, instead of the method described above, the crosslinked polyolefin resin foam sheet can also be produced by a method described in WO 2005/007731.

Examples of the blowing agent of heat decomposition type include, but are not particularly limited to, azodicarbonamide, N,N'-dinitrosopentamethylenetetramine, and p-toluenesulfonyl semicarbazide. Among them, azodicarbonamide is preferred. The blowing agents of heat decomposition type may be used singly or in combination of two or more.

The content of the blowing agent of heat decomposition type in the polyolefin resin composition is preferably 1 to 15 parts by mass, more preferably 1 to 12 parts by mass, and further preferably 1 to 8 parts by mass based on 100 parts by mass of the polyolefin resin. When the content of the blowing agent of heat decomposition type is within the above ranges, the foamability of the polyolefin resin composition will be improved; a polyolefin resin foam sheet having a desired expansion ratio will be easily obtained; and tensile strength and compression recovery properties will be improved.

Examples of other additives used in the step (1) include a decomposition temperature regulator, a crosslinking auxiliary, and an antioxidant.

The decomposition temperature regulator is blended for reducing the decomposition temperature of the blowing agent of heat decomposition type or increasing or controlling the decomposition rate, and examples of specific compounds thereof include zinc oxide, zinc stearate, and urea. The decomposition temperature regulator is blended, for example, in an amount of 0.01 to 5 parts by mass based on 100 parts by mass of the polyolefin resin, in order to adjust the surface state or the like of the foam sheet.

A polyfunctional monomer can be used as a crosslinking auxiliary. Addition of the crosslinking auxiliary to the polyolefin resin reduces the dose of ionizing radiation radiated in step (2) to be described below to thereby prevent the cutting and degradation of resin molecules accompanying the irradiation with the ionizing radiation.

Specific examples of the crosslinking auxiliary include compounds having three functional groups in one molecule, such as trimethylolpropane trimethacrylate, trimethylolpropane triacrylate, triallyl trimellitate ester, triallyl 1,2,4-benzenetricarboxylate ester, and triallyl isocyanurate; compounds having two functional groups in one molecule, such as 1,6-hexanediol dimethacrylate, 1,9-nonanediol dimethacrylate, 1,10-decanediol dimethacrylate, and divinylbenzene; diallyl phthalate, diallyl terephthalate, diallyl isophthalate, ethylvinylbenzene, neopentyl glycol dimethacrylate, lauryl methacrylate, and stearyl methacrylate.

These crosslinking auxiliaries are used singly or in combination of two or more.

The amount of the crosslinking auxiliary added is preferably 0.2 to 10 parts by mass, more preferably 0.3 to 5 parts by mass, further preferably 0.5 to 5 parts by mass, based on 100 parts by mass of the resin components. When the amount of the crosslinking auxiliary added is 0.2 parts by mass or more, the foam sheet can stably obtain a desired degree of crosslinking, and when the amount of the crosslinking auxiliary added is 10 parts by mass or less, the control of the degree of crosslinking of the foam sheet will be easy.

Further, examples of the antioxidant include phenolic antioxidants, such as 2,6-di-t-butyl-p-cresol.

Examples of the methods of foaming the polyolefin resin composition include, but are not particularly limited to, a method including heating the polyolefin resin composition with hot air, a method including heating it with infrared rays, a method including heating it with a salt bath, and a method including heating it with an oil bath. These methods may be used in combination.

The foaming of the polyolefin resin composition is not limited to the case of using a blowing agent of heat decomposition type, and physical expansion with butane gas or the like may be used.

Examples of the method for crosslinking the polyolefin resin composition include a method including blending an organic peroxide with the polyolefin resin composition in advance and heating the polyolefin resin composition to decompose the organic peroxide.

Examples of the organic peroxide used for crosslinking include 1,1-bis(t-butylperoxy)3,3,5-trimethylcyclohexane and 1,1-bis(t-butylperoxy)cyclohexane. These may be used singly or in combination of two or more. The amount of the organic peroxide added is preferably 0.01 to 5 parts by mass, more preferably 0.1 to 3 parts by mass, based on 100 parts by mass of the polyolefin resin. When the amount of the organic peroxide added is within the above ranges, the crosslinking of the polyolefin resin composition will easily proceed, and the amount of the decomposed residue of the organic peroxide in the resulting crosslinked polyolefin resin foam sheet can be suppressed.

Examples of the method for crosslinking the polyolefin resin composition further include a method including irradiating the polyolefin resin composition with ionizing radiation such as electron beams, α-rays, β-rays, and γ-rays.

The dose of ionizing radiation is preferably 0.5 to 20 Mrad and more preferably 3 to 12 Mrad so that the gel fraction may be 5 to 60% by mass.

The above-described methods for crosslinking the polyolefin resin composition may be used in combination. In view of accomplishing homogeneous crosslinking, the method including irradiation with ionizing radiation is preferred.

The polyolefin resin foam sheet of the present invention is preferably stretched in either the MD direction or the TD direction or in both the MD direction and the TD direction, as described above.

The stretching may be performed after the polyolefin resin composition is foamed to obtain a foam sheet, or may be performed while foaming the polyolefin resin composition. Note that when a foam sheet is stretched after the polyolefin resin composition is foamed to obtain a foam sheet, the foam sheet is preferably stretched without break while maintaining the molten state during the foaming without cooling the foam sheet, but a foam sheet may also be stretched after the foam sheet is cooled and then heated again to a melted or a softened state.

Further, the stretching ratio in the MD direction of the foam sheet is preferably 1.1 to 3.2 and more preferably 1.3 to 3.0. When the stretching ratio in the MD direction of the foam sheet is set to the above lower limits or more, the thermal insulation properties, flexibility, and tensile strength of the foam sheet will be easily improved. On the other hand, when the stretching ratio in the MD direction of the polyolefin resin foam sheet is set to the above upper limits or less, the foam sheet will be prevented from breaking during stretching; the reduction of expansion ratio by the escape of blowing gas from the foam sheet during foaming will be prevented; the flexibility and tensile strength of the foam sheet will be improved; and the quality will also be easily uniform. Further, the foam sheet is preferably stretched in the TD direction at a stretching ratio within the above ranges.

[Adhesive Tape]

The adhesive tape of the present invention comprises a foam sheet according to the present invention as a base material and a pressure sensitive adhesive layer provided on one surface or both surfaces of the foam sheet. The adhesive tape has a thickness of generally 0.03 to 2.0 mm, preferably 0.05 to 1.0 mm.

The pressure sensitive adhesive layer constituting the adhesive tape preferably has a thickness of 5 to 200 μm, more preferably 7 to 150 μm, further preferably 10 to 100 μm. When the pressure sensitive adhesive layer constituting the adhesive tape has a thickness of 5 to 200 μm, the thickness of the adhesive tape can be reduced, and the reduced thickness of the adhesive tape can contribute to the miniaturization and reduction in thickness of electronic equipment itself in which the adhesive tape is used.

Examples of the pressure sensitive adhesive constituting the pressure sensitive adhesive layer provided on one surface or both surfaces of the foam sheet include, but are not particularly limited to, an acrylic pressure sensitive adhesive, a urethane pressure sensitive adhesive, and a rubber pressure sensitive adhesive.

Examples of the method of applying a pressure sensitive adhesive to a foam sheet so as to laminate a pressure sensitive adhesive layer to the foam sheet include a method including applying a pressure sensitive adhesive to at least one surface of a foam sheet using a coating machine such as a coater, a method including spraying/applying a pressure sensitive adhesive to at least one surface of a foam sheet using a sprayer, and a method including applying a pressure sensitive adhesive to one surface of a foam sheet using a brush.

The adhesive tape using the foam sheet of the present invention can be used as an impact absorber which prevents an impact from being applied to the electronic components built in the body of electronic equipment, such as a mobile phone and a video camera, and as a sealing material which prevents dust, water, and the like from entering the body of electronic equipment.

EXAMPLES

The present invention will be described further in detail with Examples, but the present invention is not limited at all by these Examples.
[Measuring Methods]
The measuring method of each physical property in the present specification is as follows.
<Density and Expansion Ratio>
The density of each of the foam sheets obtained in Examples and Comparative Examples was measured according to JIS K7222, and the reciprocal of the density was defined as the expansion ratio.
<Percentage of Closed Cells>
The percentage of closed cells was measured using AccuPyc 1330 manufactured by Shimadzu Corporation according to ASTM D2856 (1998).
<Gel Fraction (Degree of Crosslinking)>
A test piece weighing about 50 mg is taken from a foam sheet obtained in Examples and Comparative Examples and precisely weighed to obtain the weight A (mg) of the test piece. Next, the test piece is immersed in 30 ml of xylene at 105° C., allowed to stand for 24 hours, and then filtered through a 200-mesh wire net to collect insoluble matter on the wire net. The insoluble matter is vacuum dried and precisely weighed to obtain the weight B (mg) of the insoluble matter. From the obtained values, the degree of crosslinking (% by mass) is calculated by the following formula.

Gel fraction (% by mass)=$(B/A) \times 100$

<Average Cell Sizes>
The foam sheets obtained in Examples and Comparative Examples were each cut into a 50-mm square piece, which was immersed in liquid nitrogen for 1 minute and then cut with a razor along a plane parallel to the MD direction and ZD direction. A photograph of the cut surface at a magnification of 200 was taken using a digital microscope ("VHX-900" manufactured by Keyence Corporation), and the cell size in the MD direction was measured for all cells present in the cut surface for a length of 2 mm in the MD direction. The operation was repeated 5 times, and the average value of all the cell sizes in the MD direction was defined as the average cell size in the MD direction.
The same procedure as described above was carried out except for cutting the foam sheet along a plane parallel to the TD direction and ZD direction of the foam sheet, a photograph of the cut surface at a magnification of 200 was taken, and the cell size in the TD direction was measured for all cells present in the cut surface for a length of 2 mm in the TD direction. The operation was repeated 5 times, and the average value of all the cell sizes in the TD direction was defined as the average cell size in the TD direction.
<Tensile Strength at 23° C. and Tensile Strength at 90° C.>
The tensile strength of each of the foam sheets obtained in Examples and Comparative Examples was measured at 23° C. or 90° C. using a tensile tester according to JIS K6767 (Method A). The value of the tensile strength is preferably high in view of improving the shear strength of the sheet.

<25% Compressive Strength>
The 25% compressive strength refers to that obtained by measuring a polyolefin resin foam sheet according to JIS K6767. The value of the 25% compressive strength is preferably low in view of improving the flexibility and the conformability to irregularities.
<Shear Strength at 90° C.>
An adhesive was applied to a 30-mm square area of each foam sheet. Immediately afterwards, a jig A made of wood and having a short side of 30 mm and a long side of 100 mm was placed on the portion to which the adhesive was applied, and the foam sheet and the jig A were adhered by applying pressure. The foam sheet was then cut along the size of the jig A.
Next, an adhesive was applied to that surface of the cut foam sheet to which the jig A was not adhered. Immediately afterwards, a jig B made of wood was placed on the applied adhesive, and the foam sheet and the jig B were adhered by applying pressure.
The resulting laminate was allowed to stand at room temperature for 24 hours to cure the adhesive, obtaining a sample for measuring shear strength.
Subsequently, the sample for measuring shear strength was attached to a testing machine ("TENSILON Universal Testing Machine" manufactured by A&D Company, Limited) equipped with a load cell of 1 kN so that the sheet surface of the foam sheet might be parallel to the tensile direction. One of the jigs was pulled perpendicularly upward at a rate of 100 mm/min to delaminate the foam sheet. The load at this time was measured, and the maximum value of the load was defined as the shear strength.

Example 1

One hundred parts by mass of a linear low density polyethylene (LLDPE) ("Exact 3027" manufactured by Exxon Chemical Company, density: 0.900 g/cm$^3$) as a polyolefin resin, 2.0 parts by mass of azodicarbonamide as a blowing agent of heat decomposition type, 1 part by mass of zinc oxide as a decomposition temperature regulator, and 0.5 part by mass of 2,6-di-t-butyl-p-cresol as an antioxidant were fed to an extruder, melt-kneaded at 130° C., and extruded as a continuous sheet of a polyolefin resin composition having a thickness of about 0.3 mm.
Next, the both surfaces of the above continuous sheet of the polyolefin resin composition were irradiated with 4.5 Mrad of electron beams at an acceleration voltage of 500 kV to crosslink the foam composition. Then, the resulting sheet of the crosslinked foam composition was continuously sent into a blowing oven maintained at 250° C. with hot wind and an infrared heater to be heated and foamed. While foaming the sheet of the crosslinked foam composition, the sheet was stretched at an MD stretching ratio of 1.5 and a TD stretching ratio of 1.7 to thereby obtain a foam sheet having a thickness of 0.06 mm. The evaluation results of the resulting foam sheets are shown in Table 1.

Examples 2 to 9 and Comparative Examples 1 to 8

Examples 2 to 9 and Comparative Examples 1 to 8 were performed in the same manner as in Example 1 except that the formulation of the polyolefin resin compositions was changed as shown in Tables 1 and 2; the dose at the time of crosslinking was adjusted so that gel fractions (degree of crosslinking) in Tables 1 and 2 might be obtained; and the TD stretching ratio was adjusted to 1.2 to 3.5.

In Examples 8 and 9 and Comparative Example 8, as shown in Tables 1 and 2, ethylene-vinyl acetate copolymer (EVA) (vinyl acetate content: 19% by mass, manufactured by Tosoh Corporation under the trade name "Ultrathene 636") was used as a polyolefin resin in addition to the linear low density polyethylene used in Example 1.

As is apparent from the results described above, the present invention can provide a polyolefin resin foam sheet having excellent shear strength despite being thin. More specifically, for example, a foam sheet of the present invention, despite being thin, was able to exhibit higher shear strength than another foam sheet made of the same resin and having a similar compressive strength.

TABLE 1

| | | | Example | | | | | | | | |
|---|---|---|---|---|---|---|---|---|---|---|---|
| | | | 1 | 2 | 3 | 4 | 5 | 6 | 7 | 8 | 9 |
| Composition | Polyolefin resin (LLDPE) | | 100 | 100 | 100 | 100 | 100 | 100 | 100 | 30 | 30 |
| | Polyolefin resin (EVA) | | 0 | 0 | 0 | 0 | 0 | 0 | 0 | 70 | 70 |
| | Additives (parts by mass) | Blowing agent of heat decomposition type | 2 | 2.5 | 2.5 | 7.5 | 7.5 | 10 | 14 | 2 | 5 |
| | | Decomposition temperature regulator | 1 | 1 | 1 | 1 | 1 | 1 | 1 | 1 | 1 |
| | | Antioxidant | 0.5 | 0.5 | 0.5 | 0.5 | 0.5 | 0.5 | 0.5 | 0.5 | 0.5 |
| Physical properties of foam sheet | Stretching ratio [Times] in MD direction | | 1.5 | 1.5 | 1.5 | 1.5 | 1.2 | 1.4 | 2.5 | 1.5 | 1.5 |
| | Stretching ratio [Times] in TD direction | | 1.5 | 2.2 | 2 | 1.7 | 1.6 | 1.6 | 1.2 | 2.5 | 1 |
| | Thickness [mm] | | 0.17 | 0.13 | 0.10 | 0.19 | 0.26 | 0.27 | 0.62 | 0.14 | 0.80 |
| | Expansion ratio [cm$^3$/g] | | 2.0 | 2.8 | 2.6 | 4.6 | 4.07 | 7.40 | 16.19 | 1.60 | 7.70 |
| | Density [g/cm$^3$] | | 0.50 | 0.36 | 0.39 | 0.22 | 0.25 | 0.14 | 0.06 | 0.63 | 0.13 |
| | Percentage of closed cells (%) | | 95 | 95 | 95 | 95 | 95 | 90 | 90 | 90 | 90 |
| | Gel fraction (% by mass) | | 45 | 50 | 54.1 | 54.8 | 54.8 | 52.7 | 53 | 43 | 57.3 |
| | Average cell size [μm] | MD | 51 | 70 | 78 | 74 | 89 | 71 | 127 | 55 | 80 |
| | | TD | 64 | 116 | 107 | 111 | 79 | 97 | 96 | 65 | 78 |
| | $T_M/D$ | | 7.57 | 9.83 | 9.70 | 9.57 | 6.11 | 10.36 | 10.04 | 6.72 | 46.20 |
| | $T_T/D$ | | 5.98 | 7.86 | 10.21 | 9.11 | 9.78 | 10.36 | 5.18 | 6.24 | 26.18 |
| | Tensile strength at 23° C. [MPa] | MD | 15.5 | 11.9 | 14.0 | 7.1 | 6.7 | 3.5 | 1.8 | 19 | 3.2 |
| | | TD | 11 | 7.9 | 10.9 | 5.4 | 4.2 | 2.5 | 1.1 | 11.7 | 1.9 |
| | Tensile strength at 90° C. [MPa] | MD | 3.8 | 3.5 | 3.8 | 2.1 | 1.5 | 1.4 | 0.6 | 4.2 | 6.0 |
| | | TD | 3.0 | 2.8 | 4.0 | 2.0 | 2.4 | 1.4 | 0.3 | 3.9 | 3.4 |
| | 25% compressive strength [kPa] | | 718 | 136 | 100 | 62 | 98 | 103 | 44 | 450 | 220 |
| | Shear strength at 90° C. [MPa] | | 1.22 | 1.09 | 0.79 | 0.72 | 0.88 | 0.49 | 0.39 | 2.1 | 3.37 |

TABLE 2

| | | | Comparative Example | | | | | | | |
|---|---|---|---|---|---|---|---|---|---|---|
| | | | 1 | 2 | 3 | 4 | 5 | 6 | 7 | 8 |
| Composition | Polyolefin resin (LLDPE) | | 100 | 100 | 100 | 100 | 100 | 100 | 100 | 30 |
| | Polyolefin resin (EVA) | | 0 | 0 | 0 | 0 | 0 | 0 | 0 | 70 |
| | Additives (parts by mass) | Blowing agent of heat decomposition type | 1.5 | 2 | 2.5 | 3.5 | 3.5 | 5 | 12 | 4.5 |
| | | Decomposition temperature regulator | 1 | 1 | 1 | 1 | 1 | 1 | 1 | 1 |
| | | Antioxidant | 0.5 | 0.5 | 0.5 | 0.5 | 0.5 | 0.5 | 0.5 | 0.5 |
| Physical properties of foam sheet | Stretching ratio [Times] in MD direction | | 1.5 | 1.5 | 1.5 | 2 | 1.2 | 1.4 | 2.5 | 1.5 |
| | Stretching ratio [Times] in TD direction | | 1.5 | 2.2 | 2 | 1.7 | 1.6 | 1.6 | 1.2 | 1 |
| | Thickness [mm] | | 0.16 | 0.15 | 0.11 | 0.21 | 0.32 | 0.30 | 0.61 | 0.80 |
| | Expansion ratio [cm$^3$/g] | | 2.1 | 2.7 | 3.4 | 5.27 | 5.66 | 8.17 | 15.67 | 8.00 |
| | Density [g/cm$^3$] | | 0.48 | 0.36 | 0.29 | 0.19 | 0.18 | 0.12 | 0.06 | 0.13 |
| | Percentage of closed cells (%) | | 95 | 95 | 95 | 95 | 95 | 90 | 90 | 90 |
| | Gel fraction (% by mass) | | 21 | 22.5 | 21.3 | 23.5 | 23.6 | 24.8 | 35 | 35.3 |
| | Average cell size [μm] | MD | 104 | 119 | 138 | 143 | 154 | 161 | 244 | 187 |
| | | TD | 205 | 214 | 204 | 173 | 169 | 254 | 143 | 160 |
| | $T_M/D$ | | 6.30 | 7.41 | 6.82 | 5.79 | 6.79 | 6.95 | 10.97 | 36.80 |
| | $T_T/D$ | | 5.04 | 6.04 | 7.16 | 4.79 | 4.64 | 8.17 | 4.07 | 14.40 |
| | Tensile strength at 23° C. [MPa] | MD | 15.3 | 9.8 | 8.5 | 4.8 | 5.0 | 3.0 | 2 | 3.0 |
| | | TD | 10.6 | 5.4 | 6.2 | 3.6 | 3.8 | 2.1 | 1.2 | 2.0 |
| | Tensile strength at 90° C. [MPa] | MD | 3.0 | 2.7 | 2.0 | 1.1 | 1.2 | 0.9 | 0.7 | 4.6 |
| | | TD | 2.4 | 2.2 | 2.1 | 0.9 | 0.8 | 1.0 | 0.3 | 1.8 |
| | 25% compressive strength [kPa] | | 612 | 154 | 58 | 53 | 84 | 87 | 51 | 270 |
| | Shear strength at 90° C. [MPa] | | 0.72 | 0.65 | 0.44 | 0.4 | 0.52 | 0.22 | 0.34 | 1.59 |

The invention claimed is:

1. A polyolefin resin foam sheet formed by foaming a polyolefin resin, the foam sheet having the expansion ratio of 1.5 to 8 cm³/g, the foam sheet having the average cell sizes of 130 μm or less in the MD direction and the TD direction respectively, and satisfying the following formulas (1) and (2):

$$T_M/D \geq 6 \quad (1); \text{ and}$$

$$T_T/D \geq 5 \quad (2), \text{ where}$$

$T_M$ denotes the tensile strength in MPa at 90° C. in the MD direction,
$T_T$ denotes the tensile strength in MPa at 90° C. in the TD direction, and
D denotes the density in g/cm³ of the foam sheet,
wherein the shear strength at 90° C. is 0.3 to 10 MPa.

2. The polyolefin resin foam sheet according to claim 1, wherein the 25% compressive strength is 10 to 1,000 kPa.

3. The polyolefin resin foam sheet according to claim 1, wherein the tensile strength at 23° C. in the MD direction is 0.5 to 35 MPa.

4. The polyolefin resin foam sheet according to claim 1, wherein the tensile strength at 23° C. in the TD direction is 0.5 to 30 MPa.

5. The polyolefin resin foam sheet according to claim 1, wherein the thickness is 0.02 to 0.8 mm.

6. The polyolefin resin foam sheet according to claim 1, wherein the gel fraction is 5 to 60% by mass.

7. An adhesive tape having a pressure sensitive adhesive layer provided on at least one surface of the polyolefin resin foam sheet according to claim 1.

* * * * *